June 11, 1963 L. E. BARTON 3,092,998
THERMOMETERS

Filed Aug. 8, 1960 2 Sheets-Sheet 1

INVENTOR.
LOY E. BARTON
BY
ATTORNEY

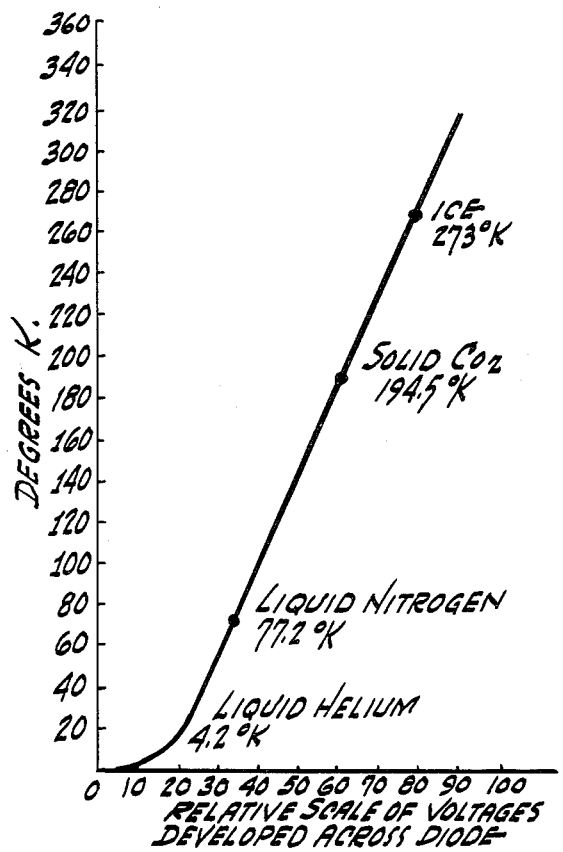
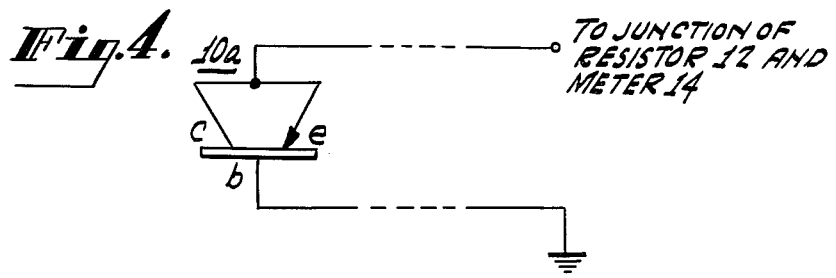

United States Patent Office 3,092,998
Patented June 11, 1963

3,092,998
THERMOMETERS
Loy E. Barton, Princeton, N.J., assignor to Radio Corporation of America, a corporation of Delaware
Filed Aug. 8, 1960, Ser. No. 48,161
8 Claims. (Cl. 73—362)

This invention relates generally to thermometers.

The thermometers of the present invention are particularly useful in technical laboratories and in industry where it is desired to measure temperatures, by means of a single thermometer, over a relatively wider range and with more uniform accuracy than is possible with comparatively simple, prior art thermometers.

Most relatively inexpensive, prior art thermometers measure temperatures satisfactorily within a relatively narrow range of temperatures. Thermometers using water, alcohol or mercury, for example, as heat sensing elements are operative over a relatively narrow range of temperatures, being obviously inoperative at temperatures below the freezing points and above the boiling points of these elements. It has been proposed to use thermistors and thermoelectric elements as heat sensing elements in thermometers, but these latter elements vary nonlinearly with temperature, thereby making them non-uniform in sensitivity over a relatively wide temperature range. Ordinary resistors, such as carbon resistors and certain wires, sense temperatures satisfactorily, but they, too, are non-linear devices of unequal sensitivity over a relatively wide range of temperatures. They are also relatively much larger in size compared with the heat sensing elements of the present invention.

Accordingly, it is an object of the present invention to provide improved thermometers utilizing semiconductor rectifying devices connected in simple circuits for sensing temperatures over a relatively wide range of temperatures with substantially uniform sensitivity.

Another object of the present invention is to provide an improved thermometer that uses a relatively small sensing element in comparison with the prior art elements, and which causes a voltage thereacross to be varied substantially linearly over a relatively wider range of temperatures, the lowest temperature being only a few degrees above absolute zero.

Still another object of the present invention is to provide an improved thermometer that indicates temperatures continuously, either locally or at a remote point, over a relatively wide range of temperatures.

A further object of the present invention is to provide an improved thermometer that may have an expanded scale for any portion of the temperature range.

Still a further object of the present invention is to provide an improved thermometer that utilizes an inexpensive device in an electric circuit that is relatively simple in construction, very reliable in operation, and highly efficient in use.

In accordance with the present invention, the improved thermometer comprises a semiconductor rectifying device, such as a germanium diode, in a circuit such that a voltage is established across the diode that varies linearly with the temperature of the diode when a substantially constant current flows through the diode. This voltage is believed to be a function of the band-gap voltage of the diode. The diode is utilized as a heat sensing element and is connected in the circuit to cause a substantially constant current to flow through it in a forward biased direction. Since the voltage developed across the diode varies linearly with its temperature, means are provided to measure this temperature as a function of this voltage. This voltage may be measured directly by means including a meter connected across the diode, or by means of a variable voltage source and a meter connected so as to obtain a null when the voltage of the variable voltage source is equal to the voltage across the diode. Either the meter or the variable voltage source, or both, can have a scale, calibrated in degrees of temperature, cooperatively associated therewith for indicating the temperature of the diode.

The novel features of the present invention, both as to its organization and methods of operation, as well as additional objects and advantages thereof, will be more readily understood from the following description, when read in connection with the accompanying drawings, in which similar reference characters refer to similar parts, and in which:

FIG. 4 is a schematic diagram of a transistor connected to provide a heat sensing element with diode characteristics, in accordance with the present invention; and FIG. 5 is a graph illustrating the linearity of the thermometer illustrated in FIG. 3 using a heat sensing element such as illustrated in FIG. 4.

Figure 1:
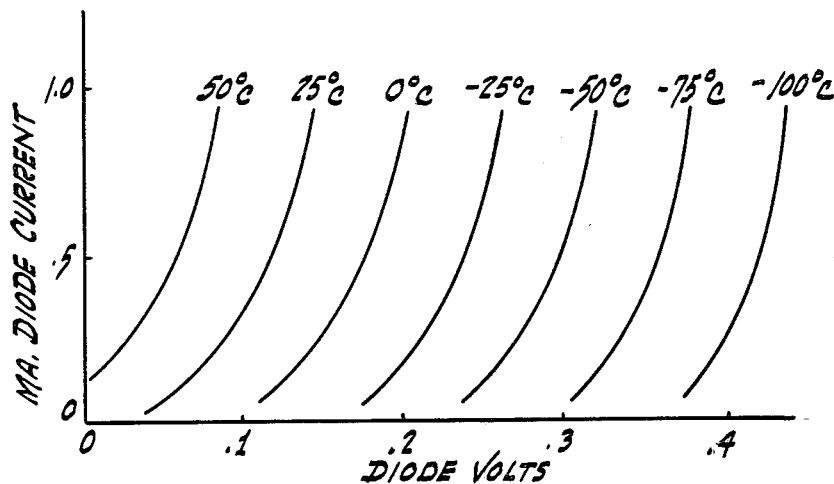
FIG. 1 is a graph to illustrate that the voltage established across a diode by a given diode current is linearly proportional to the temperature of the diode over a wide range of temperatures.

Referring, now, to FIG. 1, there is shown a graph to illustrate the temperature-voltage linearity characteristic of a particular germanium diode (type 1N2324). The curves of the graph, each curve showing current plotted against voltage for a given temperature, indicate that the voltage across the diode is linearly dependent on its temperature for a given diode current, as evidenced by the curves for equal increments of temperature being spaced at equal distances from each other along the voltage axis. This set of curves also indicates that the upper temperature limit for temperature-voltage linearity of the diode is between 25° C. and 50° C., as estimated by the temperature of the curve that would just pass through zero volts and zero current. It is noted that silicon diodes and silicon carbide diodes exhibit much wider ranges of temperature-voltage linearity, a silicon diode having an upper temperature limit of about 150° C., and a silicon carbide diode having an upper limit that is much higher than that of the silicon diode.

Figure 2:
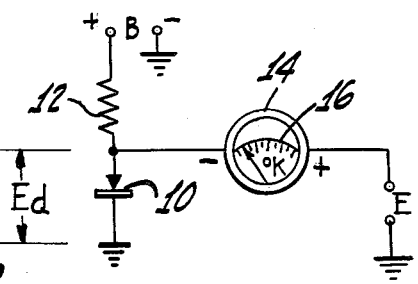
FIG. 2 is a schematic diagram of a simple embodiment of a thermometer in accordance with the present invention.

The simplest embodiment of the thermometer, in accordance with the present invention, is shown in FIG. 2. A rectifying device, such as a diode 10 of the germanium silicon or other types, is used as a heat sensing element. The diode 10 is relatively small in comparison with most of the conventional, prior art heat sensing element. The anode of the diode 10 is connected to the positive terminal of a voltage source B through a current limiting resistor 12. The negative terminal of the voltage source B is connected to a common connection, illustrated herein as ground. The cathode of the diode 10 is also connected to ground.

As connected in FIG. 2, the diode 10 is forward biased by the unidirectional voltage source B so that current flows through the diode 10 easily. A relatively small voltage that varies linearly with the temperature of the diode 10 is established across the diode 10 when the current through it is substantially constant. It is believed that this voltage is determined by (1) the band-gap voltage component of the diode and (2) the voltage component due to the internal resistance of the diode. These voltage components may vary in the case of diodes of different materials. It is further believed that the voltage component due to resistance is constant for a given current as the temperature varies. Since the resistance of the resistor 12 is relatively high, and the potential difference between the voltage source B and the voltage developed across the diode 10 is also relatively high for all temperatures of the diode, the current through the diode 10 may be considered substantially constant for all temperatures of the diode. The voltage established across a germanium diode, for example, varies linearly from about 0.7 v., near absolute zero, about .08 v. at about 320° K.

Means are provided to measure the temperature of the diode 10 as a function of the voltage developed across it when a substantially constant current passes through it. To this end, the negative terminal of a microammeter 14 is connected to the anode of the diode 10, and the positive terminal of the meter 14 is connected to ground through a voltage source E. The voltage source E may be a source of variable voltage providing an output voltage that may be set to equal a voltage $E_d$, where $E_d$ is the voltage across the diode 10 for the lowest temperature in the range of temperatures desired to be measured. For this temperture, the meter 14 would read zero. As the temperature of the diode 10 increases, the voltage across it decreases, and current flows from the voltage source E to the diode 10. With the polarity of the terminals of the meter 14 connected as shown in FIG. 2, the temperature of the diode 10 may be read on a temperature-calibrated scale 16 cooperatively associated with the meter 14. The scale 16 may be calibrated in degrees of any desired temperature system, as, for example, in degrees Kelvin. Thus, it will be understood that, by providing a desired voltage for the variable voltage source E and by using a germanium diode 10, temperatures ranging from a few degrees above absolute zero to over 300° K. may be measured by adding the temperature represented by the voltage E ($=E_d$) to the temperature indicated on the scale 16.

Figure 3:
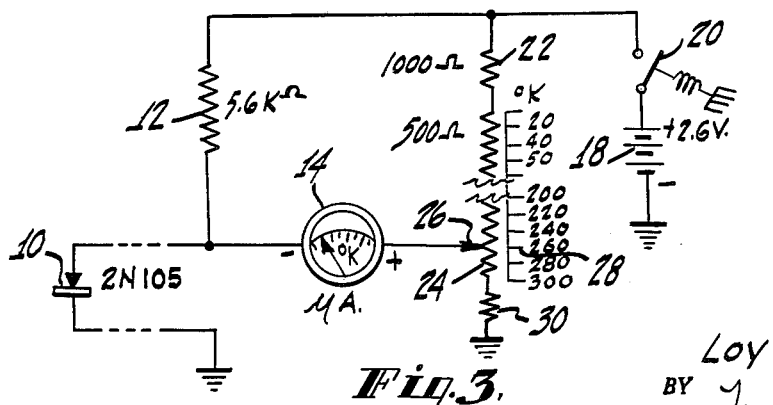
FIG. 3 is a schematic diagram of another embodiment of a thermometer in accordance with the present invention.

Referring, now, to FIG. 3 there is shown another embodiment of a thermometer in accordance with the present invention and wherein the aforementioned voltage source B and the variable voltage source E are derived from a single unidirectional voltage source 18, illustrated in the drawing as a battery. The negative terminal of the voltage source 18 is connected directly to ground, and the positive terminal of the voltage source 18 is connected to ground through a series circuit comprising a switch 20, a resistor 22, a resistor 24 of a potentiometer, and a resistor 30. The resistor 30 may be considered to have zero resistance for the present discussion. The switch 20 is spring biased in a normally open position to conserve the battery when not in use. The resistor 12 is connected to the voltage source 18 through the switch 20.

The potentiometer includes a variable tap 26 on the resistor 24 to provide a variable voltage of any desired value, within a range of values, when the switch 20 is closed. The tap 26 is connected to the positive terminal of the meter 14. A scale 28, calibrated in degrees of temperature, is cooperatively associated with the variable tap 26 of the potentiometer to indicate the temperature of the diode 10 by the position of the tap 26 when the voltage between ground and the tap 26 is equal to the voltage across the diode 10, that is, when the meter 14 is nulled to zero by the adjustable tap 26. If the voltage at the tap 26 does not quite cause the pointer of the meter 14 to read zero, the temperature of the diode 10 is indicated by the sum of the temperatures indicated on the calibrated scales 28 and 16. If the resistor 30 has zero value, the maximum temperature reading on the potentiometer scale 28 will be the maximum temperature to which the diode is responsive. By choosing a proper value for the resistor 30, and, if necessary, also the value of the resistances of the potentiometer 24 and the resistor 22, the range of the scale 28 can be changed and the maximum temperature on the scale 28 can be limited to any desired value.

Referring, now, to FIG. 4, there is shown a transistor 10a adapted to be used for a heat sensing element in the circuit of FIG. 3, in place of the diode 10. The emitter and collector electrodes of the transistor 10a are connected to each other and to the negative terminal of the meter 14. The base of the transistor 10a is connected to ground. Connected as shown in FIG. 4, the transistor 10a functions as a rectifying device and develops a voltage thereacross when current flows through it in a forward biased direction. As stated above, the voltage so developed is believed to be a function of the band-gap voltage of the material of the rectifying device. The band-gap voltage is determined by two electronic energy levels, one of which is the top of the valence band, and the other of which is the bottom of the conduction band of the rectifying material. The magnitude of this voltage is related to the nature of the chemical bonds in the material comprising the rectifying device. Since the resistance component of the rectifying device is believed to be substantially constant, it appears that the band-gap voltage varies linearly with the temperature and increases as the temperature decreases.

Because of the band-gap voltage developed in the rectifying devices 10 and 10a, the dynamic source impedance of these devices is relatively low in comparison with prior art, heat sensing elements of the resistor and thermistor types. Also, because of the low dynamic impedances of the rectifying devices 10 and 10a, low impedance μA. meters 14 may be used, either for direct measurements or for producing a null, thereby markedly increasing the sensitivity of the thermometers of the present invention over a relatively wider range of temperatures than has been possible heretofore.

Because a small diode was desired, a transistor 10a was connected as a rectifying diode device, as shown in FIG. 4. The transistor 10a was substituted for the diode 10 in FIG. 3, and the temperature-voltage curve shown in FIG. 5 was obtained. The values of the components indicated on FIG. 3 are merely illustrative and are not to be construed in a limiting sense. An inspection of the curve of FIG. 5 indicates that the temperature-voltage characterictic of the diode device 10a is substantially linear from a few degrees above absolute zero to about 320° K. Also, the temperature of liquid helium, 4.2° K., could be easily indicated. The use of silicon diodes and silicon carbide diodes would extend this linear range even further in an upward direction. It will be understood, however, that by changing the values of the resistors 22, 30, and 24, small portions of the linear temperature range may be measured on a full scale with greater accuracy. By selecting the resistor 30 for a given voltage, and by decreasing the resistance of the resistor 24, a limited temperature range may be read starting at any desired temperature.

From the foregoing description, it will be apparent that there have been provided improved thermometers that are simple in construction and that record temperatures linearly over a relatively much wider temperature range than has been possible with most prior art thermometers. Since the diode sensing elements are small, temperatures may be indicated relatively quickly, and the sensing elements may be at a point remote from the temperature indicating means. Once the temperature of an environment has been determined, departures from this temperature may be observed by noting changes on the temperature scale associated with the meter and/or the temperature scale associated with the potentiometer.

What is claimed is:

1. A thermometer comprising a semiconductor rectifying device, means to apply a source of potential across said device to cause a relatively constant current to flow therethrough in a forward biased direction to establish a relatively small voltage thereacross, said voltage being proportional to the temperature of said device over a relatively wide range of temperatures, indicating means, voltage means, and means connecting said voltage means and said indicating means in series with each other and with said device to indicate the temperature thereof as a function of said voltage, said voltage means comprising a variable resistor having cooperatively associated therewith a scale calibrated in degrees of temperature.

2. Apparatus comprising a rectifying device across which a voltage is established when current is sent therethrough in a forward biased direction, means connected to said device to send a relatively constant current therethrough in a forward biased direction to establish said voltage, said voltage varying substantially linearly with the temperature of said device over a relatively wide range of temperature, indicating means calibrated to indicate temperature, and means comprising a potentiometer having a resistor and a scale cooperatively associated therewith calibrated in degrees temperature connecting said indicating means across said device to measure the temperature of said device as a function of said voltage.

3. A thermometer comprising a semiconductor rectifying device across which a voltage is established when current is sent therethrough in a forward biased direction, means connected to said device to send a relatively constant current therethrough in a forward biased direction to establish said voltage, said voltage varying substantially linearly with the temperature of said device, indicating means, potential varying means for a source of potential, and means including said potential varying means to connect said indicating means in series with said device to indicate the temperature of said device, said indicating means and said potential varying means each including a scale cooperatively associated with said potential varying means, said scales being calibrated in degrees of temperature.

4. A thermometer comprising a semiconductor device having three electrodes, two of said electrodes being connected to each other, said device being adapted to have a voltage established between said two connected electrodes and the third of said three electrodes when current is sent through said device in a forward biased direction, means connected to said device to send a relatively constant current therethrough in a forward biased direction to establish said voltage, said voltage varying substantially linearly with the temperature of said device, indicating means, variable voltage means comprising a variable resistor having cooperatively associated therewith a scale calibrated to indicate degrees of temperature, and means including said variable resistor connecting said indicating means to said device to measure the temperature of said device as a function of said voltage.

5. A thermometer comprising a diode having an anode and a cathode, a resistor, means to connect a source of voltage in series with said resistor and said diode to bias said diode in a forward direction, a potentiometer having a resistor and a variable tap, means to connect said resistor of said potentiometer across said source of voltage, indicating means having a pair of terminals, means connecting one of said terminals to said variable tap, means connecting the other of said terminals to said anode, and a scale calibrated in degrees of temperature cooperatively associated with said resistor of said potentiometer and said variable tap, said indicating means including a scale calibrated in degrees temperature.

6. A thermometer comprising a transistor having an emitter electrode, a collector electrode and a base electrode, a resistor, means connecting one end of said resistor to said emitter electrode and to said collector electrode, means to connect a source of voltage between the other end of said resistor and said base electrode, a potentiometer having a resistor and a variable tap, means to connect said resistor to said source of voltage, indicating means having two terminals, means to connect one of said two terminals to said variable tap, means to connect the other of said two terminals to said one end of said resistor, and a scale calibrated in degrees of temperature cooperatively associated with said resistor of said potentiometer and said variable tap.

7. A thermometer comprising a semiconductor diode, means for producing a flow of substantially constant current through said diode in a forward direction to thereby establish a voltage thereacross, said diode being responsive to temperature variations over a range of temperatures and having the characteristic of effecting variations in said voltage thereacross substantially linearly in response to temperature variations over said range while said current therethrough remains substantially constant, and indicating means connected across said diode for indicating said voltage variations as a function of said temperature variations.

8. A thermometer comprising a semiconductor diode, means for producing a flow of substantially constant current less than saturation current through said diode in a forward direction to thereby establish a voltage thereacross, said diode being responsive to temperature variations over a range of temperatures and having the characteristic of effecting variations in said voltage thereacross substantially linearly in response to temperature variations over said range while said current therethrough remains substantially constant and less than saturation current, and indicating means connected across said diode for indicating said voltage variations as a function of said temperature variations.

References Cited in the file of this patent

UNITED STATES PATENTS

| | | |
|---|---|---|
| 2,504,628 | Benzer | Apr. 18, 1950 |
| 2,696,739 | Endres | Dec. 14, 1954 |
| 2,909,662 | Von Hippel et al. | Oct. 20, 1959 |
| 2,980,808 | Steele | Apr. 18, 1961 |

OTHER REFERENCES

Publication, "Journal of Scientific Instruments," vol. 32, November 1955 pp. 451–2, an article by A. G. White.

"A Note on the Transistor as a Thermometer," available in the Scientific Library.